Sept. 6, 1932. G. F. WIKLE 1,876,375
MACHINE FOR MAKING ANNULAR ARTICLES
Filed Sept. 13, 1929 13 Sheets-Sheet 9
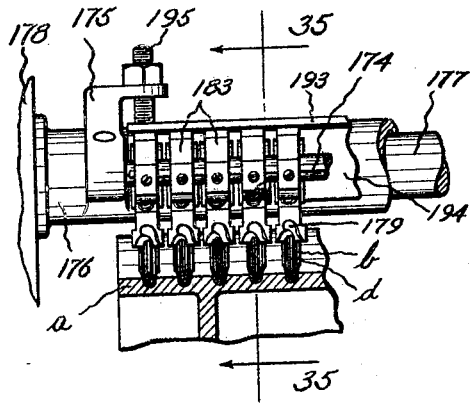
Fig. 34.
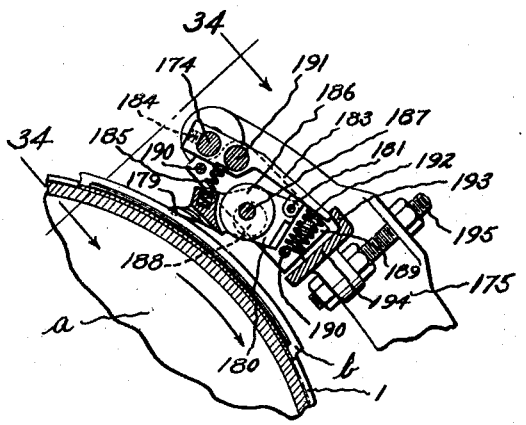
Fig. 35.
Fig. 36.
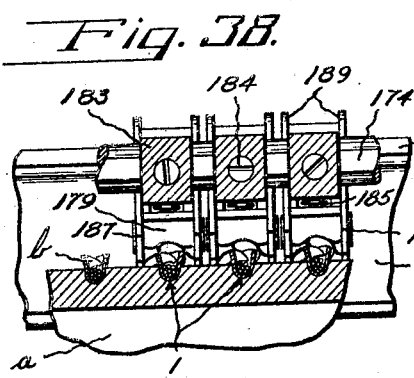
Fig. 38.
Fig. 37.
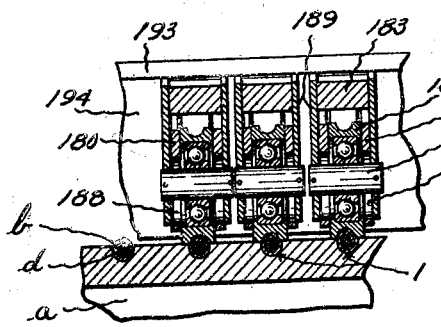
Fig. 39.
INVENTOR.
GEORGE F. WIKLE
BY
ATTORNEY.

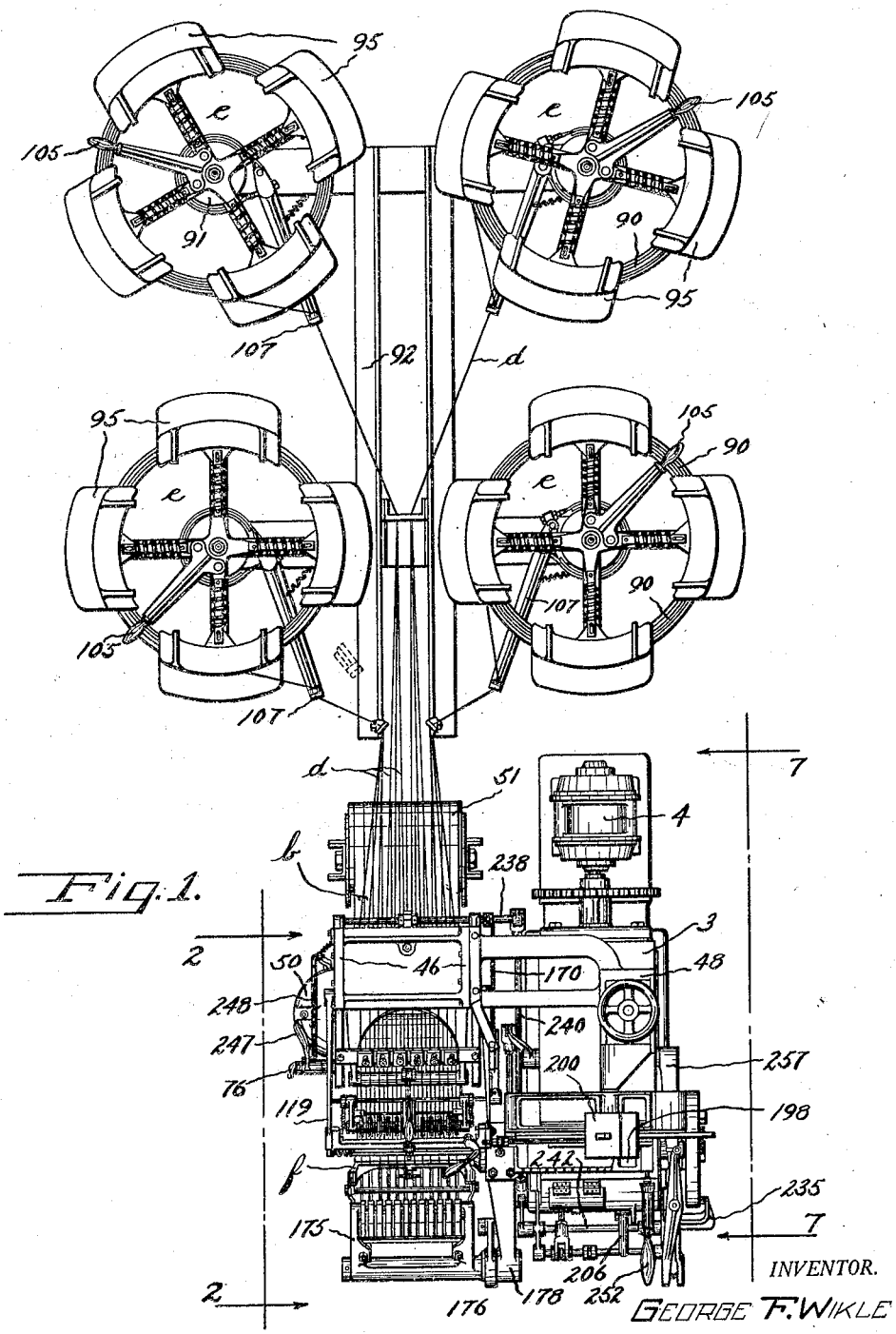

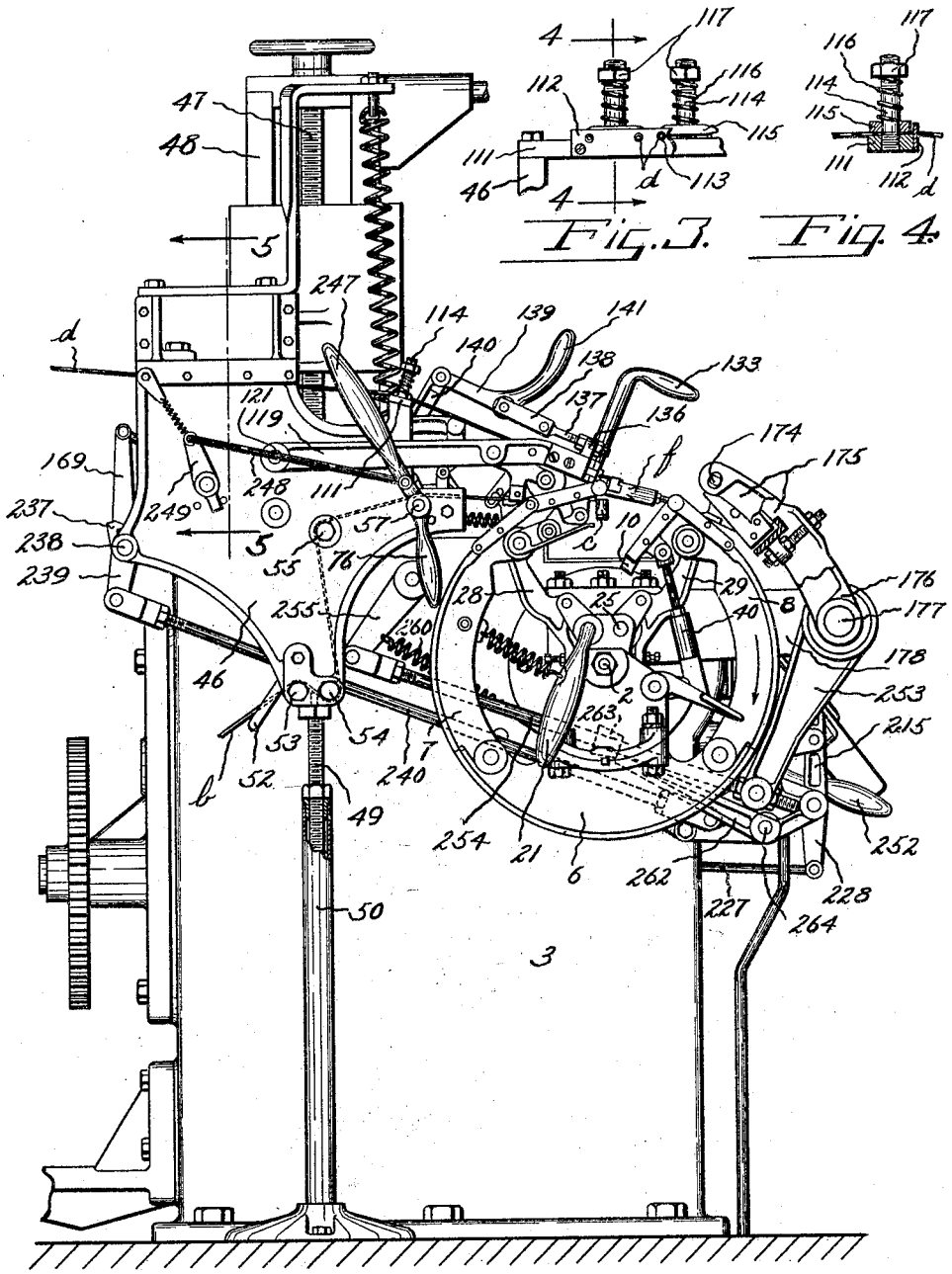

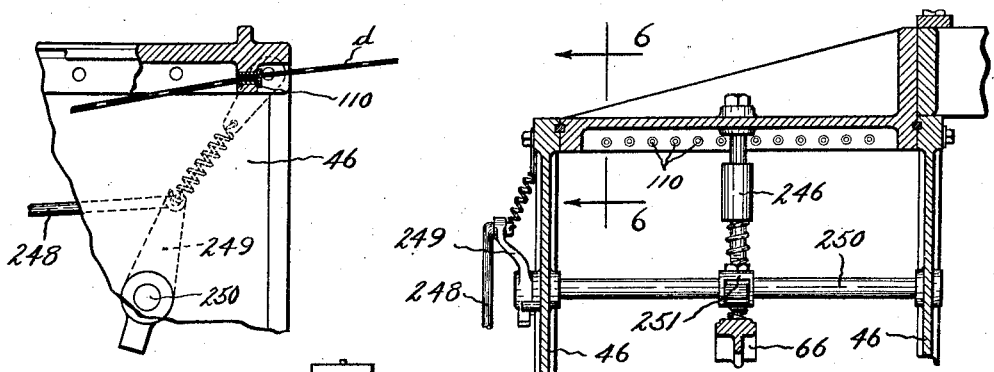
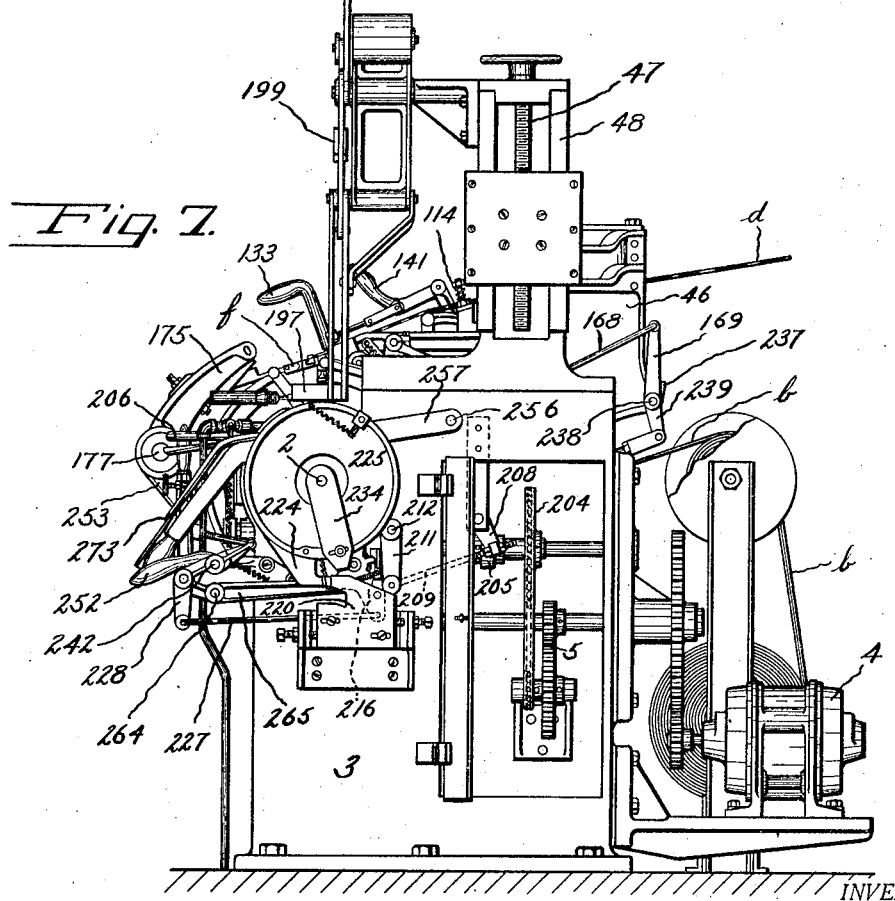

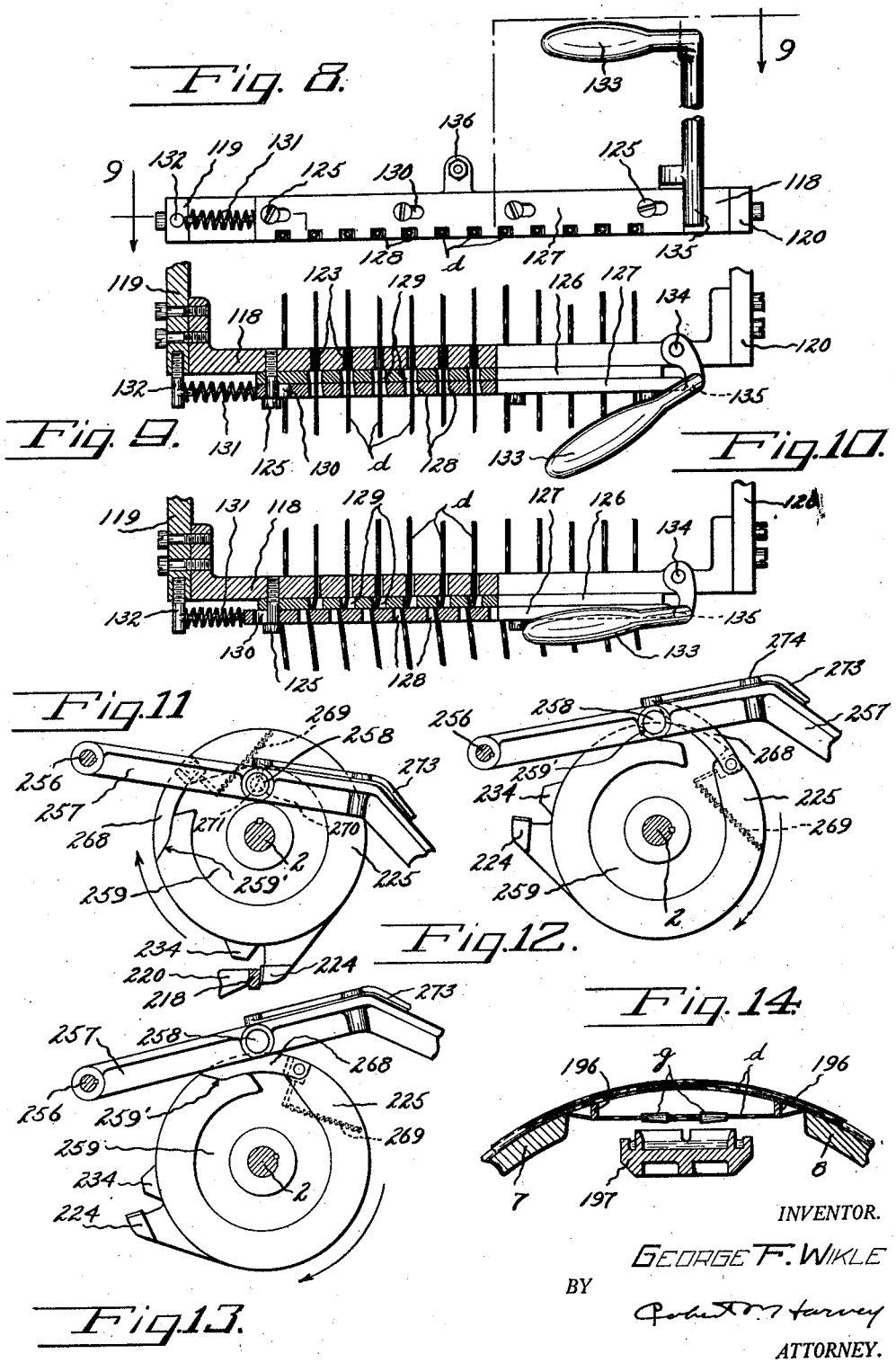

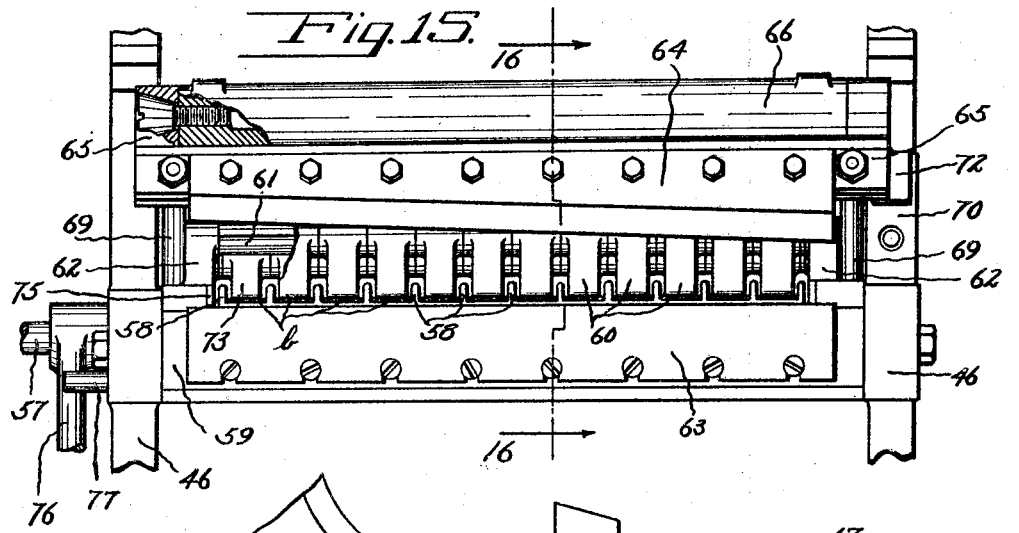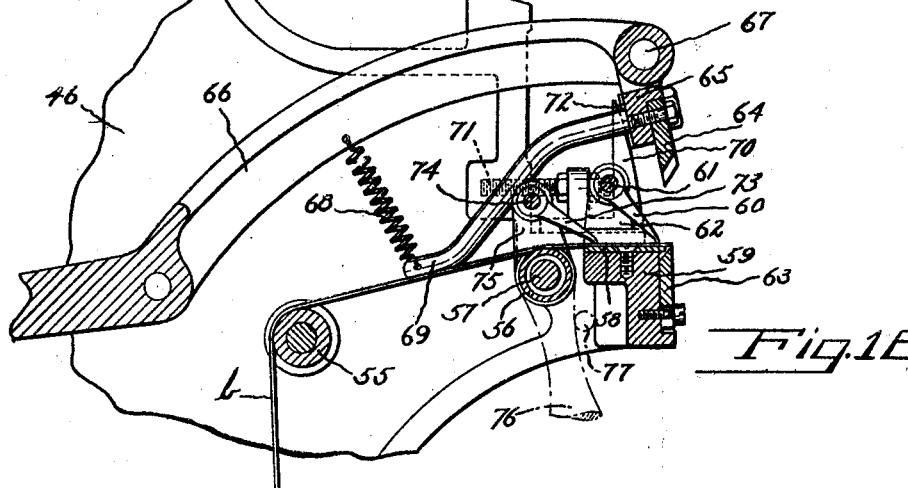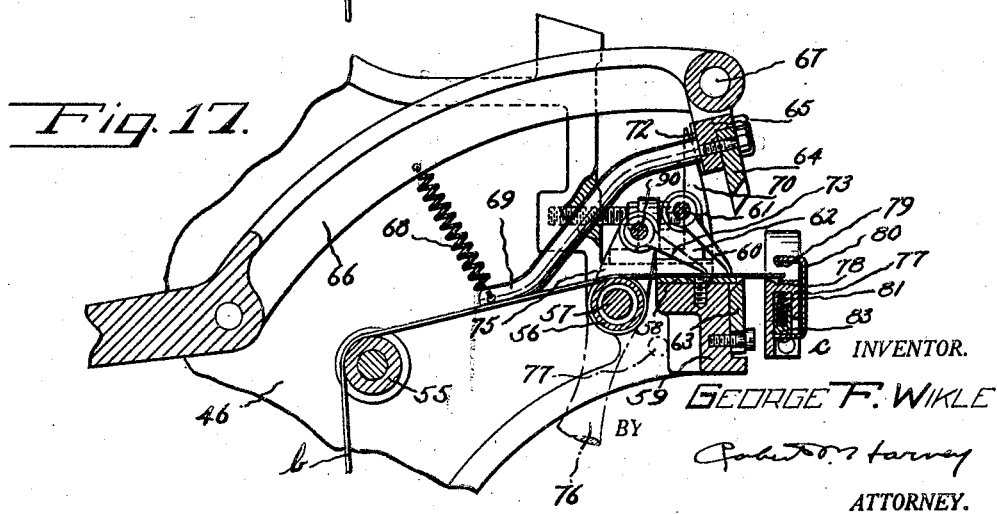

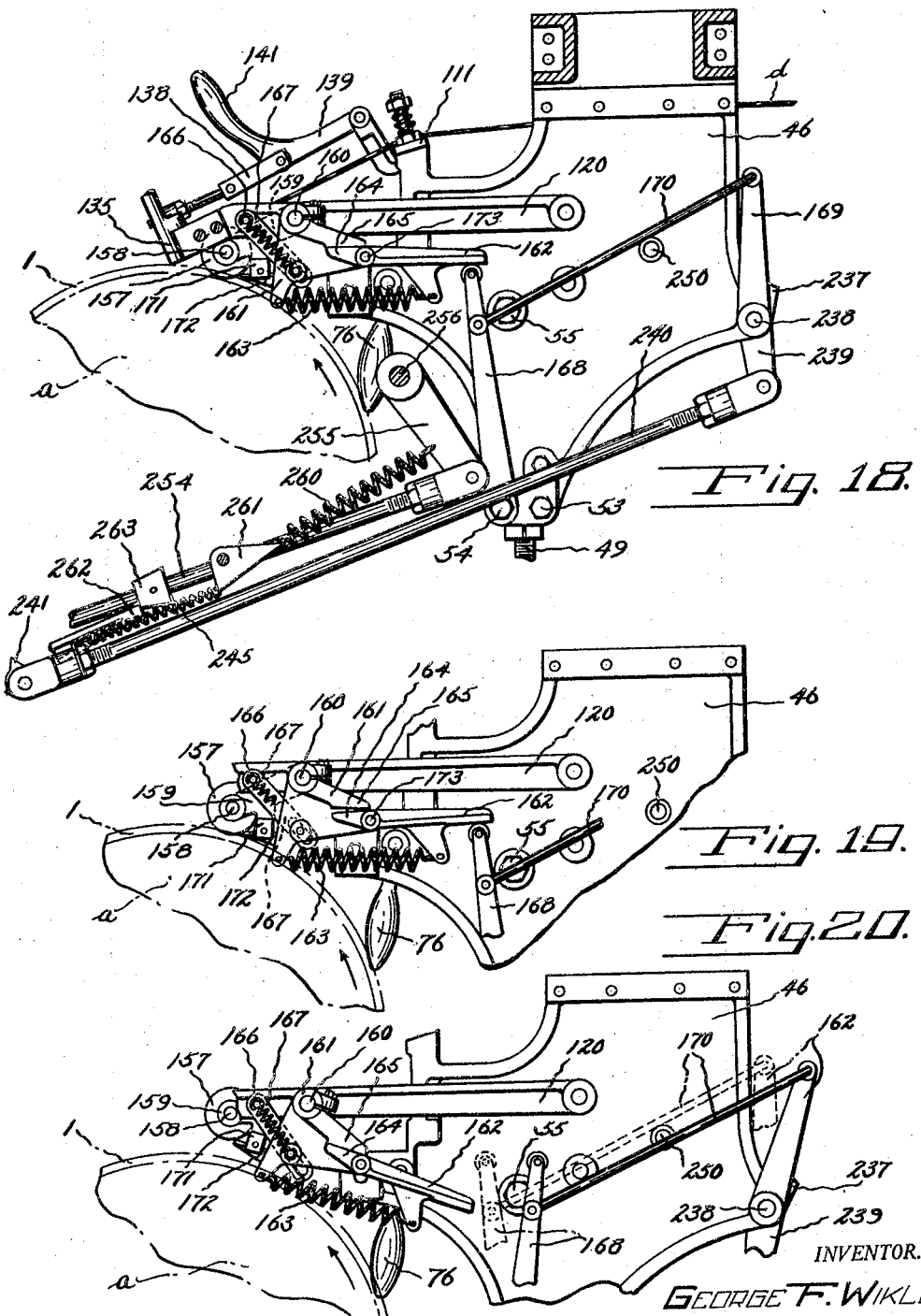

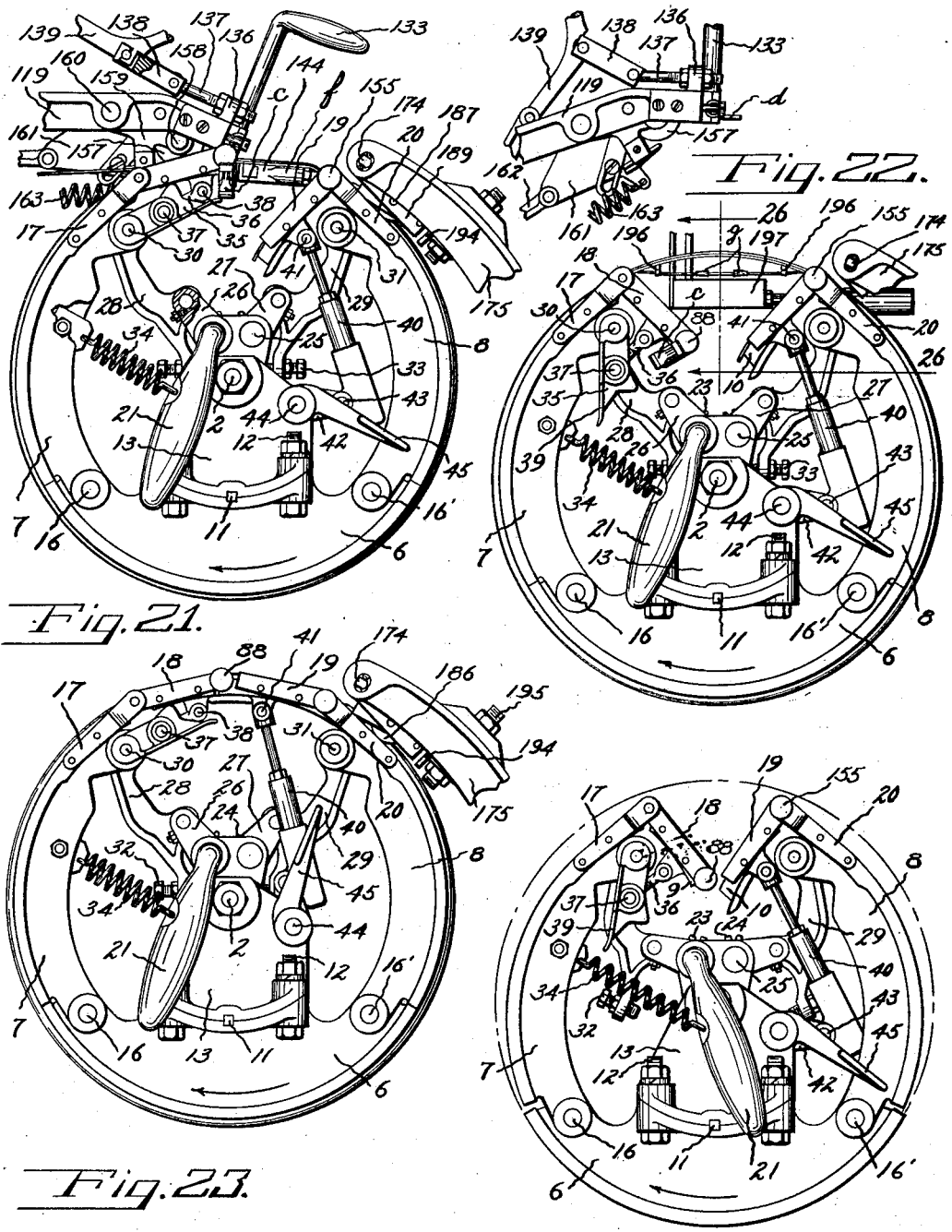

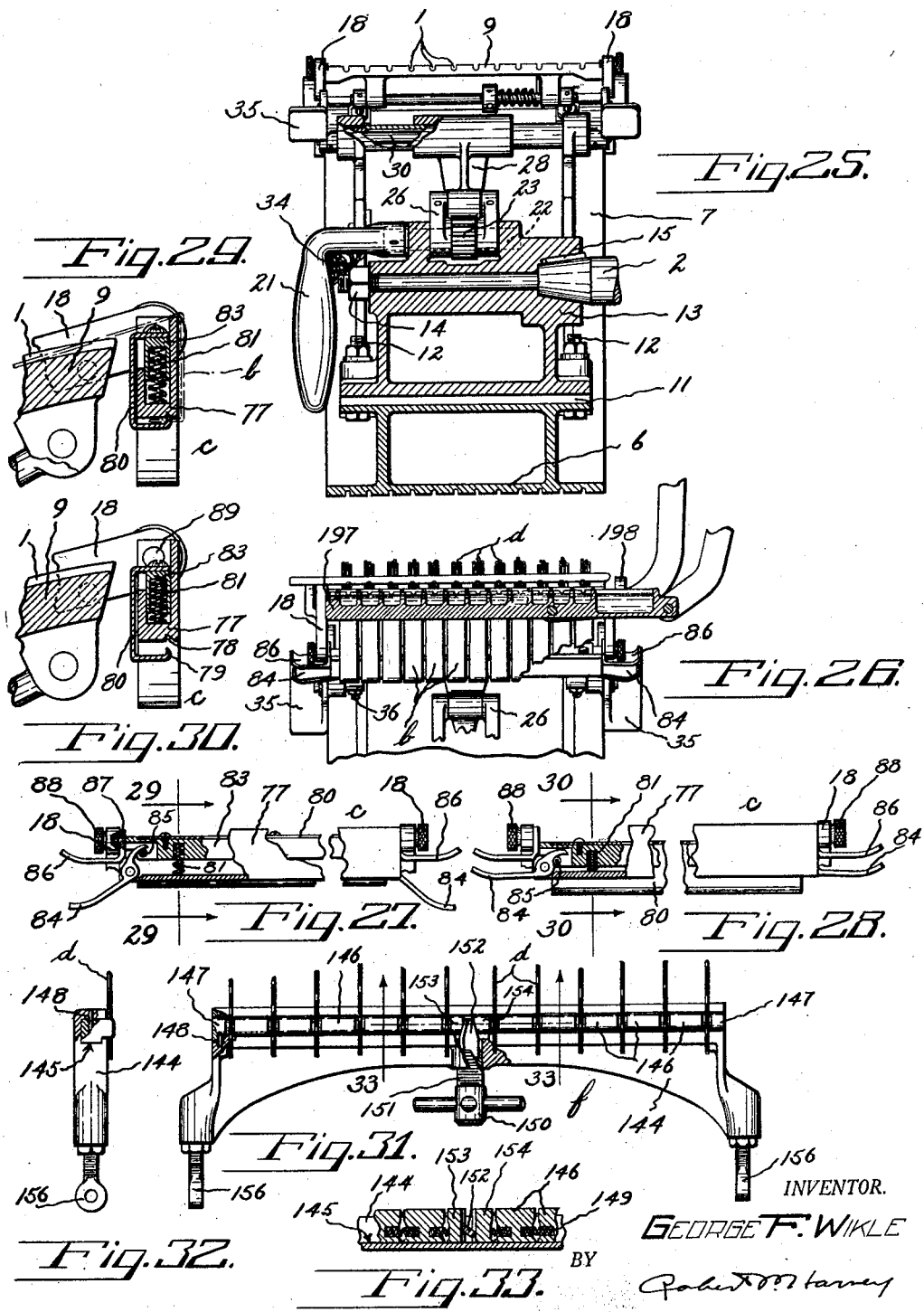

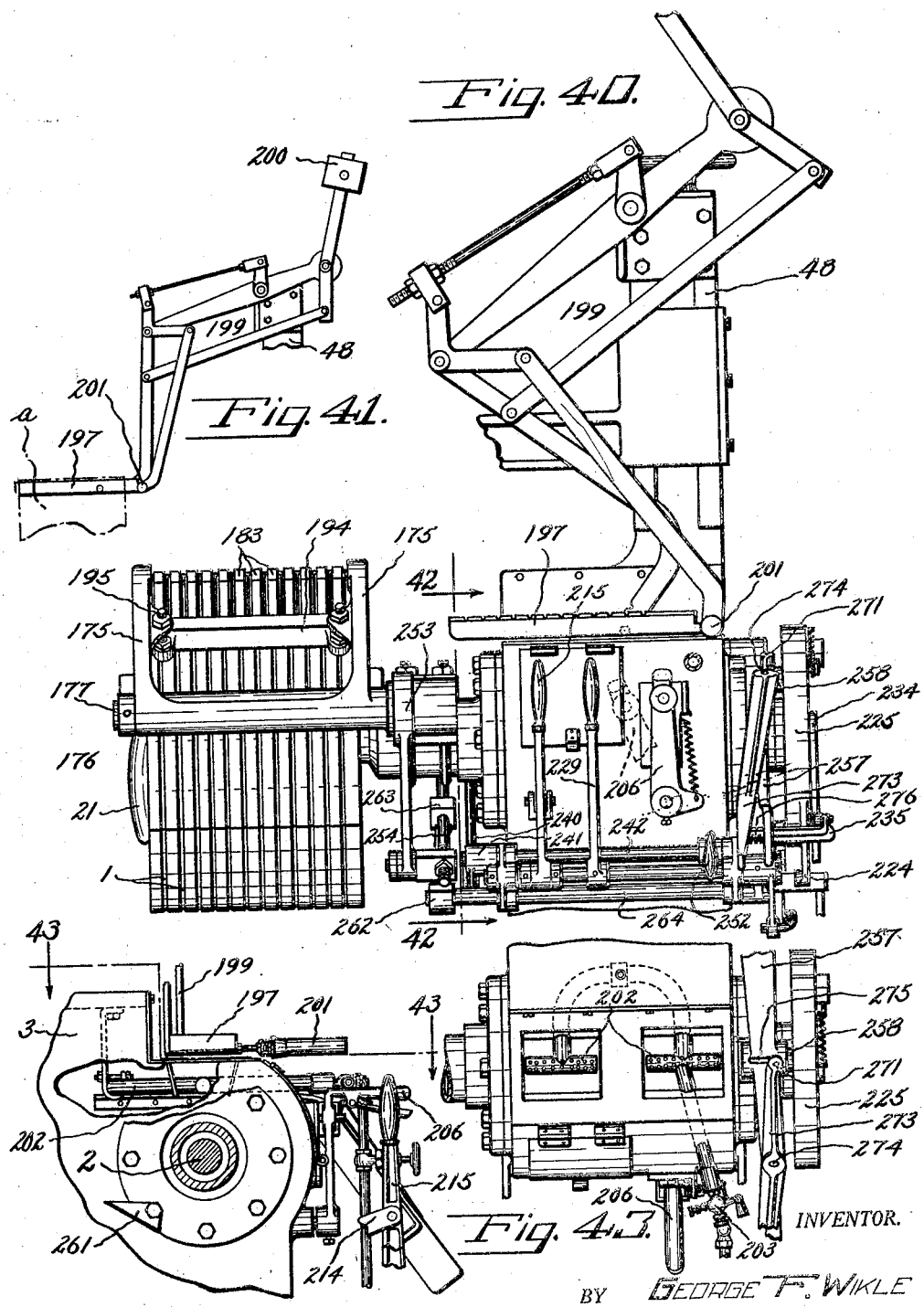

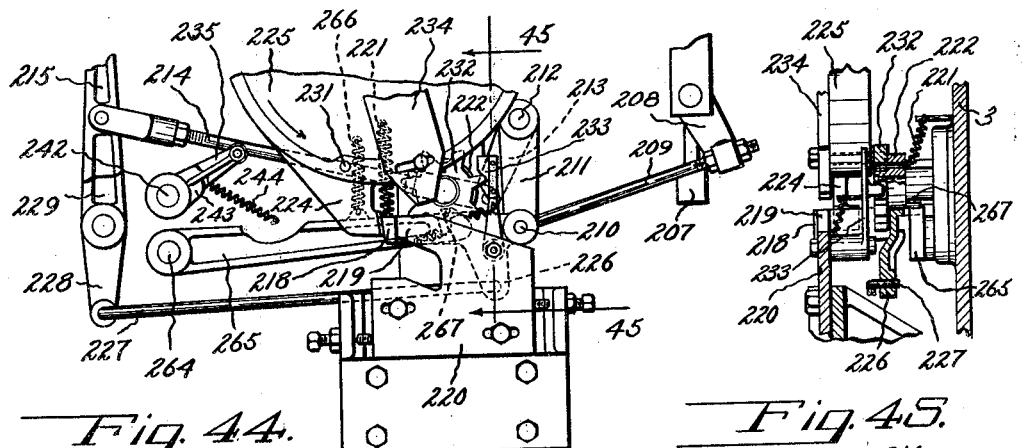
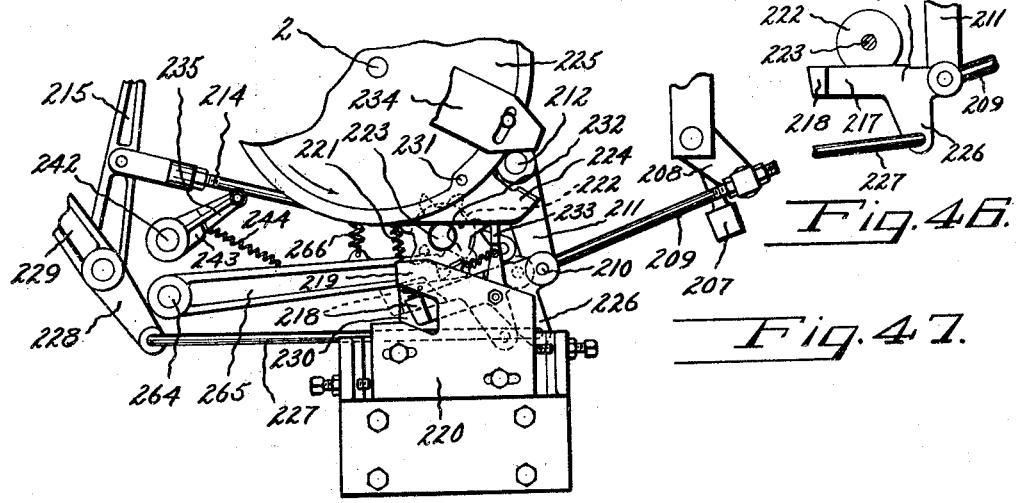

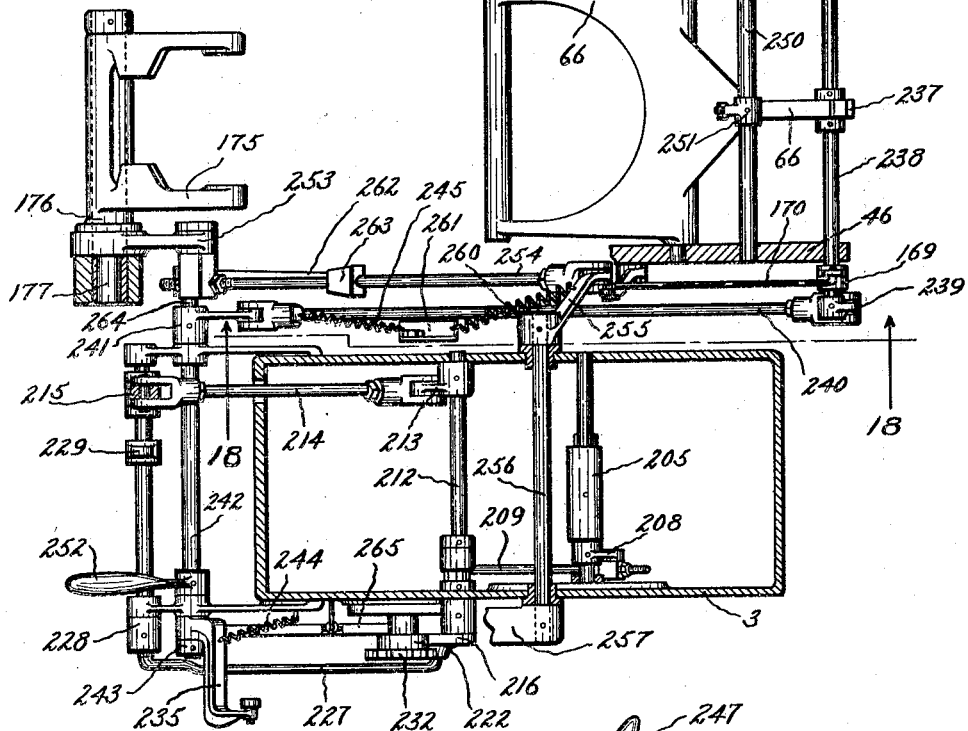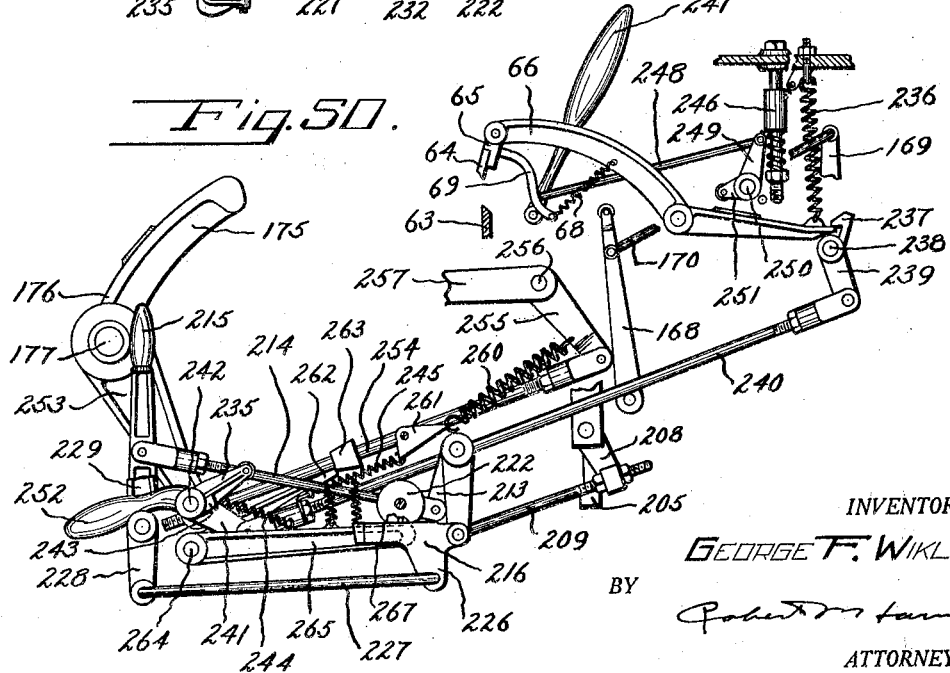

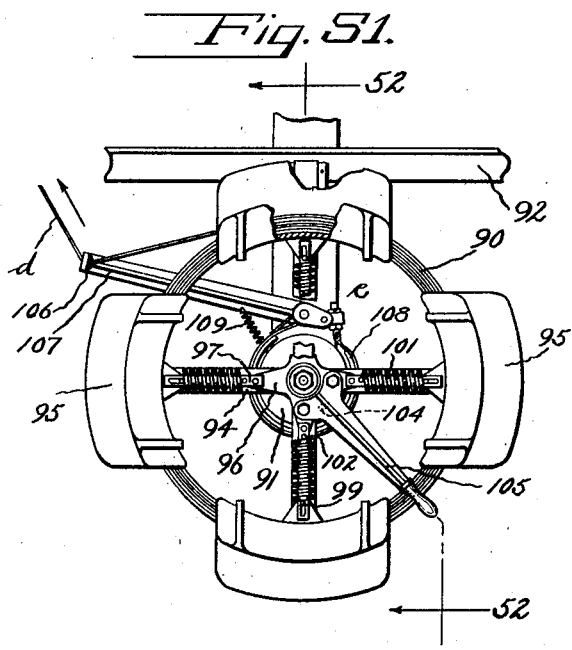
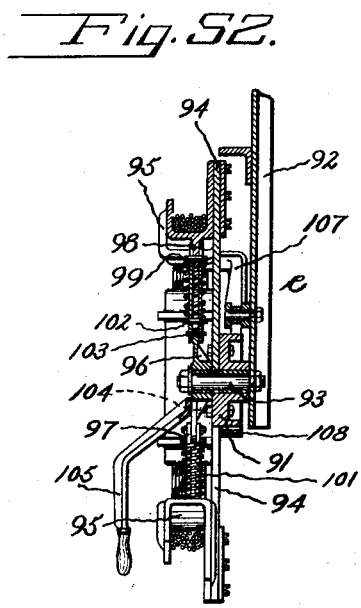
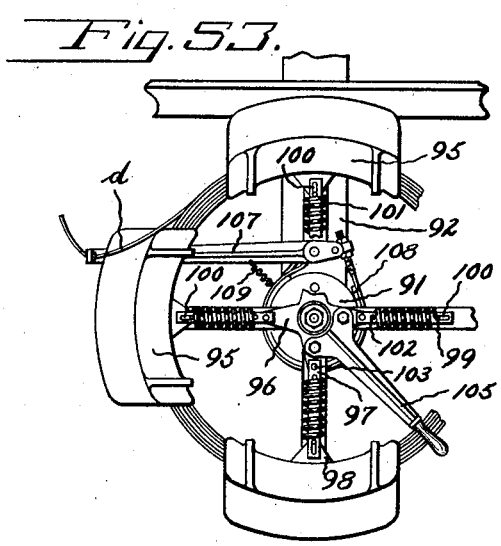
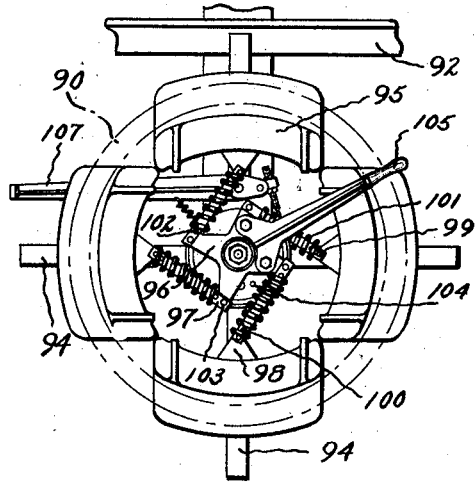
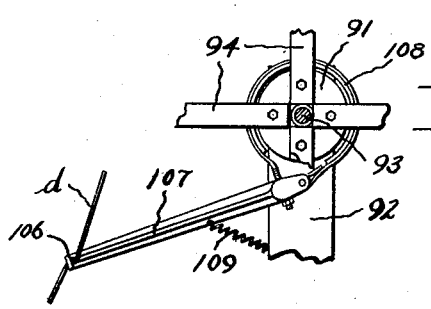

Patented Sept. 6, 1932

1,876,375

UNITED STATES PATENT OFFICE

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

MACHINE FOR MAKING ANNULAR ARTICLES

Application filed September 13, 1929. Serial No. 392,346.

This invention relates to a machine for building annular articles formed of reinforcing strands covered with fabric or the like. It is particularly adapted to the manufacture of the bead cores used in the bead portions of pneumatic tire casings and the embodiment hereinafter described is especially designed for such use.

In general the objects of my invention are to provide a machine substantially automatic in operation, to secure a more uniform product and to effect economies in manufacture by combining in substantially one operation a number of operations which have heretofore been separately performed, and by increasing the production. Other and further objects will be apparent from the following specification and claims.

In the accompanying drawings which illustrate one embodiment of my invention,

Fig. 1 is a plan view of a bead making machine;

Fig. 2 is a view taken on line 2—2 of Fig. 1;

Fig. 3 is a detail of the wire tensioning device;

Fig. 4 is a view taken substantially on line 4—4 of Fig. 3;

Fig. 5 is a section on a larger scale taken substantially on line 5—5 of Fig. 2;

Fig. 6 is a section taken on line 6—6 of Fig. 5;

Fig. 7 is a view taken on line 7—7 of Fig. 1;

Fig. 8 is a detail view of the wire cutting mechanism;

Fig. 9 is a view taken on line 9—9 of Fig. 8;

Fig. 10 is a similar view, but showing the wires cut;

Figs. 11 to 13 are detail views of the plow operating cam mechanism;

Fig. 14 is a detail view showing the wire splicing operation;

Fig. 15 is a detail view of the fabric cutting knives and associated mechanism;

Fig. 16 is a view taken substantially on line 16—16 of Fig. 15;

Fig. 17 is a similar view, but showing certain parts in different positions;

Figs. 18 to 20 are views showing trip mechanism for releasing the fabric pressing rolls, taken substantially on line 18—18 of Fig. 48;

Fig. 21 is a side view of the bead building drum at the finish of the wire winding operation;

Fig. 22 is a similar view showing ferrules in place on the wire ends and the solder tray ready to be brought up about the ferrules;

Fig. 23 is a similar view with the drum in complete annular form for finishing the bead;

Fig. 24 is a view of the collapsed drum;

Fig. 25 is a section taken on the vertical center line of the drum when in the position shown in Fig. 21, the fabric and wire being omitted;

Fig. 26 is a section taken substantially on line 26—26 of Fig. 22;

Fig. 27 is a view of the fabric clamp, partially in section and in fabric clamping position;

Fig. 28 is a similar view, but with the clamp in open position;

Fig. 29 is a section on a larger scale taken substantially on line 29—29 of Fig. 27;

Fig. 30 is a similar section taken on line 30—30 of Fig. 28;

Fig. 31 is a view, partially broken away, of the wire clamp with wires clamped in position;

Fig. 32 is an end view of the clamp;

Fig. 33 is a section taken substantially on line 33—33 of Fig. 31;

Fig. 34 is a view of the fabric plows taken substantially on line 34—34 of Fig. 35 before the plows are brought into operation;

Fig. 35 is a section taken substantially on line 35—35 of Fig. 34;

Fig. 36 is a similar view showing the plows at the start of their folding operation;

Fig. 37 is a similar view showing the plows fully in operation;

Fig. 38 is a section taken substantially on line 38—38 of Fig. 37;

Fig. 39 is a section taken substantially on line 39—39 of Fig. 37;

Fig. 40 is a view looking at the end of the machine with parts broken away and showing a soldering tray in inoperative position;

Fig. 41 is a detail view showing the soldering tray in soldering position;

Fig. 42 is a section taken substantially on line 42—42 of Fig. 40;

Fig. 43 is a section taken substantially on line 43—43 of Fig. 42;

Fig. 44 is a detail view of the drum rotating and stopping mechanism with the drum at rest;

Fig. 45 is a view taken substantially on line 45—45 of Fig. 44;

Fig. 46 is a detail view of a cam shown in Fig. 44;

Fig. 47 is a view similar to Fig. 44 but showing the mechanism at the beginning of the rotation of the drum, the drum then moving at slow speed;

Fig. 48 is a similar view showing the mechanism when the drum is rotating at high speed;

Fig. 49 is a detail plan view of the linkage and operating handles of the machine;

Fig. 50 is an elevation of parts shown in Fig. 49;

Fig. 51 is an enlarged view of one of the wire holding spools shown in Fig. 1;

Fig. 52 is a section taken substantially on line 52—52 of Fig. 51;

Fig. 53 is a view similar to Fig. 51, but showing the spool locked by a brake to prevent rotation;

Fig. 54 shows the spool contracted and in position to receive a coil of wire; and Fig. 55 is a detail view showing the spool brake mechanism for a spool on the opposite side of the center line of the creel from that shown in Figs. 51-54.

A general description of the parts and their function in the machine is first given as an aid in understanding the subsequent detailed description of the means for automatically operating the various parts.

Referring to Figs. 1 and 2, a designates a drum provided with a series of grooves 1 in which the bead cores are built. Drum a is secured to a shaft 2 supported in a housing 3 and driven, in the direction indicated by the arrow in Fig. 2, from a motor 4 through gearing 5 (see Fig. 7). The drum a, as best shown in Figs. 2 and 21 to 25 inclusive, is made collapsible and comprises five segments 6, 7, 8, 9 and 10, of which 6 is secured by key 11 and bolts 12 to a chuck 13 secured to the shaft 2 (see Fig. 25) by a nut 14 and a key 15. The two segments 7 and 8 are pivoted respectively at 16 and 16' to the segment 6. Segment 9 is pivotally secured by hinge members 17 and 18 to the free end of segment 7 and segment 10 is similarly pivoted to segment 8 by hinges 19 and 20. The segments 7 and 8 are adapted to be simultaneously swung about their pivots to collapse the drum, as shown in Fig. 24, for removal of the finished bead cores, by means of a handle 21 secured to the shaft 22 of a pinion 23 which meshes with a pinion 24 secured to a parallel shaft 25. Shafts 22 and 25 are provided respectively with toggle arms 26 and 27 pivoted at their free ends to respective links 28 and 29, the other ends of which are respectively pivoted to segments 7 and 8 at 30 and 31. The links 28 and 29 are provided with adjustable stops 32 and 33, it being understood that the toggles are moved slightly past their dead centers when the segments are in expanded position and a spring 34 connecting handle 21 and segment 7 tends to maintain the position of the toggles on both sides of their centers.

The drum segments 9 and 10 are, as will later appear, collapsed during portions of the building operation and are therefore provided with independently actuated toggles. The toggle which actuates segment 9 comprises links 35 and 36 pivoted together at 37 and to segments 7 and 9 respectively at 30 and 38. Link 35 is provided with a projecting flange 39 which serves as a handle by which its toggle may be operated. The toggle by which segment 10 is actuated comprises an adjustable link 40 pivoted to the segment 10 at 41 and to an arm 42 at 43. Arm 42 is secured to a stub shaft 44 carried in the chuck 13 and provided with an operating handle 45.

The bead cores, which the machine illustrated is designed to build in the grooves 1 of the drum just described, comprise a plurality of convolutions of wire about which is longitudinally wrapped a strip of fabric. In general the operation consists in winding into each groove, on the first rotation of the drum, a narrow strip of fabric and simultaneously therewith the first convolution of wire on top of the fabric. After this first rotation of the drum, the fabric is cut and continued rotation of the drum winds on the desired number of convolutions of wire, the longitudinal edges of the fabric being brought together about the wire, except at the splice, during the last of these rotations of the drum. The wire is then cut, the ends of the wire soldered, and the longitudinal edges of the fabric strip brought together to enclose the splice, thus completing the bead in each groove of the drum.

The devices for feeding forward and cutting the fabric and wire are carried in a frame 46 (see Figs. 1 and 2) which is positioned adjacent drum a and supported in vertically adjustable position by a screw 47 mounted in a frame 48 carried by a housing 3 and screw 49 threaded into a standard 50.

The fabric strips b (see Figs. 1, 15, 16, and 17) are drawn from a reel 51 through spacer blades 52 over tensioning rollers 53, 54 and 55 and over a roller 56 on a shaft 57 carried by the frame 46. From roller 56 the strips pass to a channeled guide 58 (see Figs. 15 and 16) carried by a bar 59 secured in frame 46. Pawls 60 freely mounted on a shaft 61 supported in lugs 62 of bar 59 prevent rearward movement of the strips. A knife blade 63 is fixed to the bar 59 in position to cooperate with a movable blade 64 secured to a bar 65 pivoted on a lever 66 at 67. Springs 68 connected to lever 66 and bent rods 69 projecting from bar 65 tend to tilt knife 64 about its pivot, this movement being limited by a stop 70 adjustably secured at 71 to the frame 46, which is engaged by an extension 72 on bar 65. Stop 70 is so formed as to cause blade 64 to make a tight engagement with blade 63 to assure proper cutting action, blade 64 being inclined as shown in Fig. 15 to afford a shearing cut when the blade is brought down as later described.

The fabric is drawn into the grooves of the drum by being clamped to the edge of drum segment 9 and for this purpose I provide a clamping member c, shortly to be described. In order that the fabric strips may be projected beyond the cutter so as to be engaged by the clamp, a series of pawls 73 are mounted on a shaft 74 carried by a pair of arms 75 keyed to shaft 57 to which is secured an operating handle 76. Pawls 73 normally rest on the strips as shown in Fig. 16, and when handle 76 is moved rearwardly, as shown in Fig. 17, the points of the pawls engage the strips and advance them as shown in the latter figure. The clamp c (see Figs. 17 and 27 to 30) is detachable from the machine and is brought by the hand of the operator to the fabric engaging position of Fig. 17. After the strips are engaged by the clamp the clamp is rotated (clockwise as viewed in Fig. 17) and drawn outwardly to its position at the end of the segment 9 as best shown in Fig. 29. The clamp c comprises a channeled bar 77 provided with a groove 78 with which the pronged edge 79 of clamping member 80 is adapted to engage under the action of a plurality of springs 81 seated in apertures 82 formed in the bar 83 fitting in the channel of bar 77 and to which member 80 is secured. To facilitate the opening of the clamp to receive the ends of the strips I provide a pair of levers 84 pivoted at opposite ends of the bar 77 which engage pins 85 secured in bar 83. Rigid handles 86 are also secured to bar 77 and by pressing lever 84 toward handles 86, as shown in Fig. 28, the clamping jaw will be opened. The clamp is detachably secured to the end of segment 9 by means of pins 87, provided with knurled heads 88, which are carried in the ends of hinge members 18 (see Figs. 27 and 29) and adapted to engage in holes 89 formed in bar 77.

The wire d is also drawn into position in the grooves of the drum through rotation of the drum by clamping the cut end to one of the drum segments as later described in detail. The wires may be supplied to the machine from any suitable creel but the one shown in Figs. 1 and 50 to 54, inclusive, has certain advantages.

Spools e, for supporting the reels 90 of wire d, each comprising a pulley 91, are rotatably fastened to the creel frame 92 by a stud 93. Fixed to each pulley at substantially right angles are segment arms 94, each slidably supporting a reel segment 95. These segments are connected to a spider 96 by means of links 97. Each segment 95 has a lug 98 which carries a pin 99 riding in slots 100 in the links 97, and a compression spring 101 is positioned around links 97 and between pin 99 and a pin 102 secured to the link. A pin 103 is used as a pivot between the links and the spider 97.

The slots 100 will allow the springs 101 to cause a yielding pressure to be exerted by the segments 95 on the reels 90, thereby keeping the wire d from becoming loose. Fixed between two arms of the spider 96, which is normally held against a stop pin 104 carried by the pulley, is a handle 105 which, when given a partial rotation, will cause the segments 95 to be drawn toward each other. This position, shown in Fig. 54, will enable reels of wire to be easily placed over the segments. After locating the wire on the segments the handle 105 is drawn back until the spider 96 again comes against the pin 104.

Drawing the wire d from the spools e has a tendency to spin the spools about the studs 93. To overcome this undesirable feature I lead each wire through a bushing 106 in an arm 107 pivoted to the creel frame 92, each arm controlling a brake 108 about its adjacent pulley 91. Normally the brake prevents the rotation of the spool e, being held in braking position by a spring 109 fastened between the frame 92 and the arm 107. When the wire d is drawn through the bushing 106 the pull of the wire will draw the arm 107 sufficiently to release the brake 108 and allow the spool to turn as the wire is drawn from it. If the pull on the wire is slackened or stopped the spring 109 will draw the arm 107 back toward the brake-setting position. The spools, shown in Figs. 51 to 54, are those on the right of the creel as shown in Fig. 1. Since the wire d is drawn in the opposite direction from the spools on the left side of the creel the braking arrangement is slightly changed, this change being shown in Fig. 55. The action of this brake is the same as the other except reversed in direction and further description thereof is believed unnecessary.

Referring to Fig. 2, the wires pass from the creel to frame 46 and through guide holes 110 (shown in detail in Figs. 5 and 6) formed in frame 46. From guides 110 the wires pass over a tensioning and retaining bar 111 (see Figs. 2, 3 and 4) which is carried by frame 46 and is provided on its forward edge with a plate 112 having apertures 113 through which the wires pass. The bar 111 carries a plurality of upright studs 114 upon which plates 115 are slidably mounted and these plates are pressed toward, and into engagement with, the wires passing over the bar 111 by springs 116 compressed between nuts 117, threaded on the ends of studs 114, and plates 115.

From bar 111 the wires pass to a cutting mechanism which is carried by a bar 118 secured between the free ends of arms 119 and 120, respectively, pivoted to the frame 46 as at 121 and 122. The bar 118 is provided as at 123 with a series of holes through which the wires pass. Secured to bar 118 by machine screws 125 is a fixed cutter 126 and a movable cutter 127 provided, respectively, with cutting notches 128 and 129 which are normally aligned as shown in Fig. 9. The screws 125 hold the cutter 126 rigidly on the bar 118 but allow the cutter 127 a short longitudinal movement by means of slots 130. A spring 131, held by a stud 132 fixed in the arm 119 and abutting against the movable cutter 127, normally holds cutter 127 in the position shown in Fig. 9. A handle 133 pivoted on the bar 118 at 134 has a lug 135 adapted to engage the end of the cutter 127. As will be obvious, clockwise movement of the handle as viewed in Fig. 9 will move cutter 127, against the action of spring 131, to shear the wires, the spring restoring the parts to normal position upon release of the handle. Bar 118 is provided with a lug 136 (see Figs. 2 and 8) which is connected by an adjustable eye bolt 137 to link 138 of a toggle, the other member of which is a link 139 pivoted to a fixed bracket 140 carried by bar 111. Link 139 is provided with a handle 141 by which the toggle may be broken permitting arms 119 and 120, together with the parts carried thereby, to be raised by the action of a tension spring 142 attached to arm 120 and a bracket 143 secured to frame 46. The raising of arms 119 and 120 not only removes the wire cutter and other parts carried by said arms from proximity to the drum, thereby leaving the drum unobstructed for other operations, but also decreases the distance between the tension and retaining bar 111 and the cutter with the result that, since retrogression of the wires is prevented by the tension bar 111, the ends of the wires are projected beyond the face of the cutter, as shown in Fig. 22, to permit the ends to be engaged by a wire clamp $f$ shown in detail in Figs. 31, 32 and 33.

The clamp $f$ comprises a yoke member 144 provided along its edge with an undercut channel 145 in which are positioned a plurality of sliding blocks 146, the ends of the channel being closed by blocks 147 secured by pins 148. As best shown in Fig. 38 the blocks are normally held separated from each other by springs 149 but are adapted to be crowded together to grip the wires $d$ between them, as shown in Figs. 31 and 33, by means of a screw 150 threaded as at 151 into member 144 and provided at its inner end with a wedge 152 engaging between the center blocks 153 and 154. After the projecting ends of the wires have been clamped, as shown in Fig. 31, toggle 138—139 is reset to bring the parts into the position shown in Fig. 21 and the wire clamp is secured to the edge of drum segment 8 by means of spring pressed pins 155 (see Fig. 21) similar to the pins 87 which secure the fabric clamp to segment 9, pins 155 engaging in eye bolts 156 adjustably threaded in the ends of yoke 144. The latter figure shows the parts in readiness for the winding operation previously mentioned.

In order that the material $b$ will lie snugly in the grooves 1 of the drum $a$ I have provided a series of rollers 157 adapted to crowd the material into the grooves during the first revolution of the drum and in advance of the application of the wires $d$ to the drum (Figs. 18–20). The rollers 157 are rotatably held on a shaft 158 carried by arms 159 which are locked to a shaft 160 carried by arms 119 and 120. Also locked to the shaft 160 is a trip arm bracket 161 carrying a pivoted trip arm 162, a strong spring 163 being held between lugs on the bracket 161 and arm 162 for forcing a finger 164 on the arm 162 against a lug 165 on the bracket, thus causing the bracket 161 and the arm 162 to normally act substantially as one piece.

A spring 166 fixed between the bracket 161 and the arm 162 tends to hold the roller unit away from the drum, its movement in this direction being limited by a lost motion link 167 carried by the same studs that carry the spring 166.

When the arms 119 and 120 are lowered so that the wire $d$ is brought adjacent the drum $a$ the trip arm 162 will come to rest against a trip lever 168 and draw the rollers into the bead grooves 1, as shown in Fig. 18, against the action of spring 166. As it is only necessary to force the material $b$ in the grooves during the time the material is fed onto the drum the trip lever 168 is drawn from under the trip arm 162 by an arm 169 and link 170, arm 169 being tripped at the same time the knife 64 is tripped to cut the material $b$ as later described. When the lever 168 is tripped the rolls will rise entirely out of engagement with the drum (Fig. 20).

The arms 159 have lugs 171 adapted to carry a bar 172 for guiding the material $b$ onto the drum just below the rollers 157. When a building drum of somewhat larger diameter than that shown in the drawings is used the finger 164 will be pivoted about a pin 173 from the lug 165 on the bracket 161, the spring 153 being stretched (Fig. 19).

After approximately the first quarter of the last rotation of drum $a$ the operation of folding the fabric longitudinally about the beads is started. This operation is performed by a series of plows best shown in Figs. 2 and 34 to 39 inclusive. The plows are made up in individual units mounted on a common rod 174 held between arms 175 of a plow support 176. This support is journaled on a shaft 177, which is carried by a bracket 178, and is adapted to be given a slight movement sufficient to bring the plows into and remove them from operative engagement with the beads under construction on the drum $a$.

Each plow 179 is formed with spaced rearwardly extending side members 180 pivoted at 181 to lugs 182 formed integral with brackets 183 secured to rod 174 by set screws 184. The plows are adapted to engage the beads with a yielding pressure, when arms 175 are moved toward the building drum, by springs 185 positioned between the plows and brackets 183. Associated with the plows are stitching rolls 186 positioned to engage the beads immediately behind the plows and firmly stitch together the edges of the fabric strips which have been longitudinally lapped over the bead wires by the plows, as best shown in Fig. 39. Rolls 186 are mounted, between the side members 180 of the plows, on shafts 187 passing through apertures 188 formed in members 180 and secured in plates 189 held in spaced relation by said shafts 187 and pins 190. The plates 189 are pivoted at 191 to brackets 183 and are spring-pressed toward the building drum by springs 192 positioned between brackets 183 and one of the pins 190. By this construction the plows 179 and rolls 186 are permitted to yield independently of each other, the former against spring 185 and the latter against spring 192. The free ends of brackets 183 engage a flange 193 formed on a bar 194 adjustably secured to arms 175 by screws 195 preventing any tendency of brackets 183 to turn about rod 174. As shown in Fig. 35, when arms 175 are retracted the downward movement of plows 179 and rolls 186 is limited by engagement of shaft 187 with the periphery of apertures 188. Initial movement of the arms 175 toward the drum brings the plows into contact with the bead, as shown in Fig. 36, and further movement of arms 175 places the rolls 186 in operative position as shown in Fig. 37.

The drum is automatically stopped, by means later described, when the last convolution of wire has been applied and the wire is then cut by operation of handle 133 and the toggle 138—139 is broken to raise the wire cutter and holder clear of the drum. The wire clamp is now removed and segment 9, to the end of which the fabric is still clamped, is lowered as shown in Fig. 22 by a breaking toggle 35—36.

The free ends of the wires $d$ are now joined (see Fig. 14) by slipping ferrules $g$ over the ends and by applying a coating of solder to the ferrules and adjacent portions of the wires. During the soldering operation the portions of the wires to be soldered are held spaced from the body of wire convolutions by means of spacing bars 196 as shown in Fig. 14. The solder is brought to the wires in a tray 197, see Figs. 26, 40 and 41, which is adapted to carry a comparatively large supply of solder for coating the wire ends and the ferrules $g$ so that time need not be lost in performing this operation. In order to minimize the chance of solder being spilled over the edges of the tray I construct the tray with a plurality of individual reservoirs fed by a storage reservoir 198. A small notch is made at each end of the individual reservoirs into which the spliced strand of wire of each bead may be set to assure complete immersion of the splice.

The tray is carried by a parallel link mechanism 199 on the upright 48 fixed to the machine housing 3. A weight 200, fixed to the link mechanism, counterbalances the weight of the tray and solder. This will allow the tray to be brought and held in any convenient position in the plane in which it is located. A handle 201 is secured to the tray by means of which it may be drawn into any position the operator desires.

As solder cools very quickly and as it must be hot to work effectively I have located a gas burner 202 within the machine housing 3, this burner being in a location so that the tray 197 may be brought over it when not being used. The burner is controlled by a valve 203 on the outside of the housing.

It is usually desirable to apply a flux to the wires and ferrules prior to the application of the solder and this may be done by a brush or other suitable means, and preferably a felt pad saturated with water is applied to the soldered splice to cool it.

As is clearly shown in Fig. 22 the ends of the wires are spliced in substantially a straight line across the gap in the drum. As a result when the segments 9 and 10 are moved into position to complete the annulus of the drum the wires are drawn taut and the convolutions aligned.

Following the soldering operation the fabric clamp $c$ is removed and the free ends of the fabric strips are spliced by hand beneath the exposed portion of the wires. The drum segments 9 and 10 are now brought into position to complete the annulus of the drum. During the last three-quarters revolution of the drum the plows have been in operation as previously described and the beads are completely wrapped except for the portions exposed for soldering. After the segments 9 and 10 have been positioned the drum is advanced a quarter turn to complete the wrapping of the fabric strips about the soldered portion of the beads. The drum is then rotated back to the position shown in Fig. 24 and collapsed, as shown in that figure, to permit removal of the completed beads.

As previously stated, power for operating the machine is supplied by a motor 4, all operating parts of the machine being operated or controlled from the shaft 2 to which the building drum is secured. Shaft 2 is driven from the motor 4 (see Fig. 7) through reducing gears 5, sprocket 204, clutch 205 and another clutch, not shown, on the shaft 2 operated by a handle 206 and adapted to disengage the drive mechanism from shaft 2 for a purpose later explained. The clutch 205 may be of any conventional two-speed type, and detailed description thereof is believed unnecessary. Similarly, the drive from the clutch 205 to shaft 2 may be of any conventional type and is therefore omitted from the drawings.

The initial position of the operating parts is shown in Fig. 44, the clutch (indicated in this figure by its shifting fork 207) being in a neutral or inoperative position. The fork is operated by an arm 208 pivotally connected to one end of a link 209 pivoted at 210 to an arm 211 secured to a rock shaft 212. A second arm 213 is also secured to shaft 212 and is connected by a link 214 to an operating lever 215. Pivoted to arm 211 at 210 is a bell crank 216, one arm 217 of which is provided with a horizontally projecting lug 218. This lug, when the parts are at rest, engages the vertical face 219 of a plate 220 as shown in Fig. 44 and is held in that position by spring 221, the upward movement of the bell crank 216 being limited by engagement with the face of a segmental cam 222 (Fig. 46) rotatably mounted on a stud 223. A lug 224 carried by a cam 225 secured to shaft 2 of the building drum engages lug 218. The second arm 226 of bell crank 216 is connected by a link 227 to an arm 228 secured on the shaft of an operating lever 229. The rotation of the building drum shaft is started by moving lever 229 counter-clockwise as shown in Fig. 47. The initial movement of lever 229 causes the bell crank 216 to turn about pivot 210 lowering lug 218 from stop 219, as shown in dotted lines in Fig. 47, and further movement of the lever causes the lug 218 to enter slot 230 in plate 220 and move the bell crank and link 209 to the full line position of Fig. 47, throwing the clutch shifting fork 207 into position to drive the shaft 2 of the building drum at slow speed. As shaft 2 rotates and with it cam 225, a pin 231 carried by cam 225 engages a star wheel 232 secured to cam 222 imparting a partial rotation to the latter to position it to prevent upward movement of bell crank 216 when the latter is released from slot 230. A spring operated finger 233 prevents the star wheel from being thrown more than one tooth at each revolution of cam 225. As soon as the star wheel has been advanced at least one tooth the clutch 205 may be shifted to high speed by moving lever 215 counter-clockwise which, as shown in Fig. 48, swings arm 211 to the left and with it bell crank 216 and lug 188, leaving the latter in position to move upwardly under the influence of spring 221 when cam 222 has made a complete revolution.

As cam 225 approaches the completion of its first revolution finger 234, adjustably secured thereto, engages a trip lever 235 which actuates the fabric cutting mechanism (previously described) as follows: Referring to Figs. 49 and 50, the lever 66 carrying the knife blade 64 is held against the action of spring 236 by a latch 237 secured to a rock shaft 238. Also secured to shaft 238 is an arm 239 which is connected by a link 240 to an arm 241 secured to a shaft 242 to which a lug 243 is also secured and against which lever 235 is held by a spring 244. As will be clear from Fig. 50, after lever 235 is tripped on the first revolution of cam 225 to release latch 237 and permit the cutter bar 65 to descend under the action of spring 236, succeeding engagement of finger 234 with trip lever 235 merely causes an idle movement of latch 237 against the action of a spring 245 which tends to hold the latch in engaging position. The cutting stroke of arm 66 is cushioned by an adjustable spring-pressed plunger 246. At the end of the building operation the cutting blade 64 is reset by means of lever 247 connected by a link 248 to an arm 249 secured to a rock shaft 250 which carries an arm 251 adapted to engage lever 66 and move it again into engagement with latch 237. The knife may be manually tripped if desired by means of a handle 252 secured to rock shaft 242.

Simultaneously with the cutting of the fabric strips, the rolls 157, which as previously described lay the strips into the grooves of the drum, are retracted by moving lever 168 from beneath trip lever 162 (see Figs. 18 to 20 and 50) through link 170 connected to arm 169 secured to rock shaft 238.

Just subsequent to the start of the final revolution of the drum, that is, after the last finger of star wheel 232 has been advanced by pin 231 to complete the revolution of cam 222, the plows carried by arms 175 secured to shaft 177, as previously described, are brought into operative position in the following manner. An arm 253 (see Figs. 49 and 50) secured to arms 175 is connected by a link 254 to an arm 255 secured to a rock shaft 256 to which is also secured an arm 257 carrying a cam roller 258 (see Figs. 11 to 13) riding in a cam groove 259 formed on the inner face of cam 225. A spring 260 (Figs. 49 and 50), secured between arm 255 and a bracket 261 secured to the frame of the machine, tends to hold roller 258 against the outer periphery of the cam groove 259, but the action of spring 260 is restrained and the roller 258 is held against the inner periphery of the cam groove to hold the plows in inoperative position by means of a trip arm 262 engaging a block 263 secured to link 254. Lever 262 is secured to a rock shaft 264 to which is secured an arm 265 normally held in raised position to maintain arm 262 in engagement with block 263 by a spring 266. Arm 265 is displaced downwardly to release arm 262 from block 263 by a lug 267 on cam 222. Upon release of block 263 arm 257 (see Figs. 11 to 13) will move counter-clockwise and roll 258, under the influence of spring 260 as previously described, will follow the outer periphery of cam groove 259 and upon continued rotation of the cam 225 will pass through a gate 268, formed in the periphery of the cam groove and normally held in closed position by a spring 269.

The weight of the arms 175 and the action of spring 260 is only sufficient to bring roll 258 to the position shown in Fig. 12 and to move the plows into contact with the building drum. Upon continued movement of cam 225 cam surface 259' forces the arms 175 and the plows 179 carried thereby further toward the drum against the action of the springs 185 and 192 carried respectively by the individual plows 179 and stitcher rolls 186 as previously described.

As above stated, star wheel 232 has completed its revolution at the time the lug 267, carried thereby, releases the plows and the flat side of cam 222 has returned to the position of Figs. 44 and 46 permitting arm 217 carrying lug 218 to rise under the influence of spring 221 and as cam 225 completes its revolution lug 218 is engaged by lug 224 to move bell crank 216 to the position shown in Fig. 44, thus shifting fork 207 of the main clutch and stopping the machine.

The wires are now cut and soldered as previously described, the fabric ends spliced and drum segments 9 and 10 moved to expanded position. There remains the operation of folding the edges of the wrapper strips about the soldered portion of the wires. The folding plows are still in operative relation with the drum and it is only necessary to throw clutch yoke 207 into slow speed by moving handle 229 (Fig. 47) counter-clockwise as previously described. As soon as the plows have passed over the spliced portion of the wires to complete the wrapping operation, the drum is stopped by returning yoke 207 to neutral through moving lever 215 or 229 to vertical position. Cam 225 has, of course, been advanced a part rotation and star wheel 232 has been advanced one point. Reverse rotation of the drum by hand will, however, restore the parts shown in Figs. 44-48 to initial position, and this reverse movement of the drum by hand is facilitated by disconnecting shaft 2 from the drive by means of the clutch previously mentioned, but not shown, which is operated by handle 206 (Figs. 40 and 43).

Prior to the reverse rotation of the drum by hand to restore shaft 2 to initial position the plows are raised from contact with the drum. To accomplish this cam roll 258 (Figs. 11–13) which is now riding on the outside circumference of cam 225 must be restored to its initial position in groove 259. Referring to Figs. 11 to 13 and to Figs. 40 and 43, cam roll 258 is mounted to slide transversely in its bearing in arm 257 and is provided with a groove 270 in which rides a pin 271 secured to a lever 273, pivoted at 274 to arm 257. The pin 271 passes through a slot 275 formed in arm 257 and the pin is normally held at the right end of the slot, as shown in Fig. 40, to keep roll 258 in operative relation with its cam by a spring 276 compressed between the free ends of lever 273 and arm 257. The roll 258 is restored to the cam groove 259 by pressing the free ends of lever 273 and arm 257 together thus swinging lever 273 about its pivot 274 and moving pin 271 to the opposite end of slot 275 withdrawing roll 258 from the outer periphery of cam 259. With the roll held in withdrawn position the arm 257 is moved downwardly to the position shown in Fig. 11, rocking shaft 256 to raise the plows and locking them in raised position by engagement of block 263 with trip 266 as previously described. Lever 273 is then released to permit roll 258 to enter cam groove 259.

A brief summary of the operation will now be given. With the drum in the position shown in Fig. 2 handle 76 is rocked to project the ends of the wrapper strips which are then gripped in clamp c and the latter secured to the end of segment 9. The wire clamp f is secured to the projecting ends of the wires, (see Fig. 22) toggle arms 138 and 139 brought into alignment as shown in Fig. 2, and clamp f secured to the edge of drum segment 8. The drum is then started in motion in low speed by throwing lever 229, and then in high speed by throwing lever 215. Toward the end of the first revolution of the drum the fabric cutter is automatically tripped to sever the wrapper strips and raise rolls 157 from the grooves of the drum. The drum continues to rotate until the desired number of convolutions of wire have been wound onto the wrapper strips in the grooves, the number being determined by the number of points on star wheel 232. Shortly after the start of the last revolution the plows are automatically lowered by the withdrawal of trip lever 262 from block 263 (Fig. 50) and the star wheel with its cam 222 having completed its revolution, arm 217 rises moving lug 218 into the path of lug 224 to shift yoke 207 into the position of Fig. 44, bringing the machine to a stop.

The wires are now cut by movement of lever 133, arms 119 and 120 are raised as shown in Fig. 22 and drum segment 9 is lowered as shown in that figure. The wires are now soldered in the manner described, the fabric clamp removed and the free ends of the wrapper strips spliced by hand. Drum segments 8 and 9 are moved into position as shown in Fig. 23 and the drum is again power driven a distance sufficient to let the folding plows complete the wrapping over the splice. The folding plows are now raised by restoring roll 258 to cam groove 259, the drum shaft is temporarily released from its drive by operation of clutch handle 206 and the drum rotated back by hand to starting position. The drum is now collapsed (Fig. 24) for the removal of the completed bead cores, the fabric cutter reset by handle 247 and the machine is ready for another cycle of operations.

Having thus described my invention, I claim:

1. A device of the character described which comprises a grooved rotatable drum, means to secure the ends of a wrapper strip and the end of a strand of core material in superposed relation in the groove of the drum in position to be wound into the groove upon rotation of the drum and means to bring the wrapper edges together longitudinally over the core to enclose the core in the wrapper.

2. A device of the character described which comprises a grooved rotatable drum, means to secure the ends of a wrapper strip and a core strand in superposed relation in the groove of the drum in position to be wound into the groove upon rotation of the drum, folding means adapted to be moved into engagement with the wrapper and core to longitudinally fold the wrapper about the core to enclose the latter.

3. A device of the character described which comprises a rotatable drum provided with a plurality of peripheral grooves, means to secure the ends of a plurality of wrapper strips to the drum in position to be wound into the grooves upon rotation of the drum, means to secure the ends of a plurality of strands of core material to the drum in position to be wound into the grooves in superposed relation with said fabric strips upon rotation of the drum and means to rotate the drum.

4. A device of the character described which comprises a rotatable drum provided with a plurality of peripheral grooves, means to secure the ends of a plurality of wrapper strips to the drum in position to be wound into the grooves upon rotation of the drum, means to secure the ends of a plurality of strands of core material to the drum in position to be wound into the grooves in superposed relation with respect to the wrapper, means to rotate the drum and means to sever the wrapper strips after a single convolution of the wrappers have been applied to the drum.

5. A device of the character described which comprises a rotatable drum provided with a plurality of peripheral grooves, means to secure the ends of a plurality of wrapper strips to the drum in position to be wound into the grooves upon rotation of the drum, means to secure the ends of a plurality of strands of core material to the drum in position to be wound into the grooves in superposed relation with respect to the wrapper, means to rotate the drum, means to sever the wrapper strips after a single convolution of the wrappers has been applied to the drum and means to thereafter stop the drum when a predetermined number of convolutions of core material have been wound on the wrappers.

6. A device of the character described which comprises a rotatable drum provided with a plurality of peripheral grooves, means to secure the ends of a plurality of wrapper strips to the drum in position to be wound into the grooves upon rotation of the drum, means to secure the ends of a plurality of strands of core material to the drum in position to be wound into the grooves in superposed relation with respect to the wrapper, means to rotate the drum, means to automatically sever the wrapper strips after a complete convolution of the wrapper has been applied in the grooves and means, automatically operative after a predetermined number of convolutions of core material have been wound on the wrappers, to stop the machine.

7. A device of the character described which comprises a rotatable drum provided with a plurality of peripheral grooves, means to secure the ends of a plurality of wrapper strips to the drum in position to be wound into the grooves upon rotation of the drum, means to secure the ends of a plurality of strands of core material to the drum in position to be wound into the grooves in superposed relation with respect to the wrapper, means to rotate the drum, means to automatically sever the wrapper strips after a complete convolution of the wrapper has been applied in the grooves, means, automatically operative after a predetermined number of convolutions of core material have been wound on the wrappers, to stop the machine, and means operative during the last rotation of the drum to fold the edges of the wrapper strips longitudinally around the core material.

8. A device of the character described which comprises a rotatable drum provided with a plurality of peripheral grooves, means to secure the ends of a plurality of wrapper strips to the drum in position to be wound into the grooves upon rotation of the drum, means to secure the ends of a plurality of strands of core material to the drum in position to be wound into the grooves in superposed relation with respect to the wrapper, means to rotate the drum, means to automatically sever the wrapper strips after a complete convolution of the wrapper has been applied in the grooves, means, automatically operative after a predetermined number of convolutions of core material have been wound on the wrappers, to stop the machine, means operative during the last rotation of the drum to fold the edges of the wrapper strips longitudinally around the core material and means to sever the strands of core material.

9. A device of the character described comprising a rotatable drum provided with a plurality of peripheral grooves and formed in collapsible segments, one segment being adapted to remain in collapsed position during rotation of the drum, a clamp to secure the ends of a plurality of strips of wrapper material to the edge of the drum opposite the collapsed segment and in position to be wound into the grooves upon rotation of the drum, a clamp to secure the ends of a plurality of strands of core material to the drum at the pivot of the collapsed segment and in position to be wound into the grooves and on top of the wrapper strips upon rotation of the drum, means to rotate the drum, rolls operative during the first rotation of the drum to force the wrapper strips snugly into the grooves of the drum, means automatically operable when a complete convolution of the wrapper has been applied in the grooves to sever the wrapper strips, means operative simultaneously with the wrapper cutting means to raise the rolls from the grooves, means to automatically stop the machine after a predetermined number of convolutions of core material have been wound onto the wrappers in the grooves, a plurality of folding plows, having stitching rolls associated therewith, normally held in spaced relation with the drum, automatic means operable during the winding of the last convolution of core material on the wrappers to bring said plows and stitching rolls into contact with the drum to fold the edges of the wrapper strips longitudinally about the core material, and means to sever the strands of core material.

10. A device of the character described comprising a collapsible drum provided with peripheral grooves, said drum being formed with a relatively fixed segment secured to the drum shaft, segments pivoted to the ends of said fixed segment and adapted when in collapsed position to substantially decrease the effective diameter of the drum, and relatively small segments hinged to the free ends of the pivoted segments and adapted to be independently collapsed to permit manufacturing operations to be performed on annular articles positioned in the grooves of the drum.

11. A device of the character described comprising a collapsible rotatable drum provided with peripheral grooves, said drum being formed with two independently collapsible segments, means to hold one of said segments in collapsed position during rotation of the drum, means to rotate the drum, means to secure the ends of strips of wrapper material to the free end of one of the drum segments in position to be drawn into the grooves when the drum is rotated, and means to secure the ends of strands of core material to the hinge of the other drum segment in position to be drawn into the grooves and on top of the wrapper strips when the drum is rotated.

12. The method of forming annular articles which comprises winding into a groove formed in the periphery of a drum a strip of wrapping material, the drum having a gap in its circumference, the free end of the wrapper being positioned in the gap, winding on the said wrapper a plurality of strands of core material, the free ends of said strands being positioned in said gap, folding the wrapper longitudinally about the strands to hold the latter in place except at the gap, joining the free ends of the wrapper and core material in substantially a straight line across the gap, straining the straight portion of the spliced wrapper and core lying above the gap into an arc continuous with the curvature of the drum and completing the folding of the wrapper about the core material.

GEORGE F. WIKLE.